(12) United States Patent
Zachrisen

(10) Patent No.: US 11,631,090 B2
(45) Date of Patent: *Apr. 18, 2023

(54) SYSTEMS AND METHODS FOR DETERMINING OFFER ELIGIBILITY USING A PREDICATE LOGIC TREE AGAINST SETS OF INPUT DATA

(71) Applicant: TRANSFORM SR BRANDS LLC, Hoffman Estates, IL (US)

(72) Inventor: Espen Zachrisen, Bartlett, IL (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/539,881

(22) Filed: Dec. 1, 2021

(65) Prior Publication Data

US 2022/0092611 A1    Mar. 24, 2022

Related U.S. Application Data

(63) Continuation of application No. 16/679,896, filed on Nov. 11, 2019, now Pat. No. 11,238,464, which is a continuation of application No. 13/495,228, filed on Jun. 13, 2012, now Pat. No. 10,475,049.

(51) Int. Cl.
G06Q 30/00    (2012.01)
G06Q 30/02    (2023.01)

(52) U.S. Cl.
CPC ..................... *G06Q 30/02* (2013.01)

(58) Field of Classification Search
None
See application file for complete search history.

(56) References Cited

U.S. PATENT DOCUMENTS

| 7,039,607 | B2 | 5/2006 | Watarai et al. |
| 7,467,106 | B1 | 12/2008 | Levine et al. |
| 8,091,142 | B2 | 1/2012 | Liu et al. |
| 8,116,453 | B2 | 2/2012 | Shnowske et al. |
| 2007/0239521 | A1 | 10/2007 | Khadpe et al. |
| 2010/0263018 | A1 | 10/2010 | Cozart et al. |

OTHER PUBLICATIONS

European Office Communication Appln No. 13 804 077.9, dated Jun. 27, 2019.

(Continued)

*Primary Examiner* — Meredith A Long
(74) *Attorney, Agent, or Firm* — McAndrews Held & Malloy, Ltd.

(57) ABSTRACT

Example computer executable instructions for determining a consumer's offer eligibility using a predicate logic tree against sets of input data are provided. In particular, the disclosed examples recite a rewards engine capable of determining a consumer's offer eligibility using a predicate logic tree against sets of input data. The rewards engine applies rules that are relevant to a particular deal offered by a retail establishment to the consumer's records to determine the consumer's offer eligibility. In some examples, the rewards engine sorts or partially sorts some or all of the consumer's records to determine the consumer's offer eligibility.

20 Claims, 6 Drawing Sheets

(56) References Cited

OTHER PUBLICATIONS

Anonymous: "Computer—Wikipedia, the free encyclopedia", Jun. 5, 2012 (Jun. 5, 2012), XP055591826, Retrieved from the Internet: URL: https://web.archive.org/web/20120605020757/https://en.wikipedia.org/wiki/Computer [retrieved on May 24, 2019].
Australian Government, Examination Report in Appln No. 2013274744, dated Oct. 26, 2017.
European Office Communication with extended European search report Appln No. 13804077.9, dated Dec. 7, 2015.
Int'l Preliminary Report on Patentability Appln No. PCT/US2013/042994 dated Dec. 24, 2014.
Int'l Search Report and Written Opinion Appln No. PCT/US2013/042994 dated Sep. 30, 2013.

Results = {{$U_a$, $D_q$, $C_{aq}$}}

LEGEND

$U_1 \ldots U_n$ are RULES $D_a \ldots D_z$ are DATA INPUT $C_{aq}$ is a COUNT of the number of times rule a has been met by data q

FIG. 4

RULE 2 REQUIREMENTS a. PROD_ID IN {baseball_card} — 604a b. SUM(UNITS) >= 1 — 604b

RULE 3 REQUIREMENTS a. PROD_ID IN {gum} — 606a b. SUM(UNITS) >= 2 — 606b

RULE 5 REQUIREMENTS a. PROD_ID IN {candy} — 610a b. SUM(UNITS) > 0 — 610b

RULE 6 REQUIREMENTS a. PROD_ID IN {comics} — 612a b. PRICE >= 7.99 — 612b c. SUM(UNITS) >= 1 — 612c

RULE 7 REQUIREMENTS a. COUPON_CODE IN {12356} — 614a b. SUM(UNITS) >= 1 — 614b

COUNTING TYPE BOOLEAN — 614c

SYSTEMS AND METHODS FOR DETERMINING OFFER ELIGIBILITY USING A PREDICATE LOGIC TREE AGAINST SETS OF INPUT DATA

The present application is a continuation of U.S. application Ser. No. 16/679,896, filed Nov. 11, 2019, which is a continuation of U.S. application Ser. No. 13/495,228, filed Jun. 13, 2012, now U.S. Pat. No. 10,475,049. Each of the aforementioned documents is hereby incorporated herein by reference in its entirety.

FIELD OF THE DISCLOSURE

The present disclosure generally relates to offer eligibility systems and methods. More particularly, the disclosure relates to systems and methods for determining offer eligibility using a predicate logic tree against sets of input data.

BACKGROUND

Simple rules-based systems and methods for determining offer eligibility are generally known in the art. In a typical case, a consumer purchases a product or group of products from a retailer (or retail establishment) that maintains a rewards program in which the consumer participates. Upon checkout, the consumer provides identifying information so that the retailer can access the consumer's rewards program account, which contains, or has access to, the consumer's records. The consumer's records may contain the consumer's purchase history, account information, coupon redemption history, etc. The consumer may then receive a deal based on the consumer's records. A set of rules set by the retailer determines which deals, if any, the consumer will receive. Of course, many categories of retailers maintain such rewards programs, including grocers, clothiers, department stores, etc.

The known rewards engines underlying such systems are generally simple rules-based systems. For example, suppose a grocer wants to offer a deal for apples at the point-of-sale to those consumers that are currently purchasing apples and have purchased apples at least once in the past month. Upon identifying the consumer's rewards program account, the rewards engine determines whether the consumer meets the offer's rule requirements: (1) is the consumer currently purchasing apples? and (2) has the consumer purchased apples at least once in the past month. The rewards engine examines the consumer records, and if the consumer meets the rule requirements, then the consumer receives the apple deal at checkout.

One drawback of such simple rules-based systems is that they often times do not have the processing power to apply complex logic rules. One reason for this is that such systems ordinarily associate the consumer records with the parent rules of the logic tree that contains the relevant rule requirements of a particular deal. Processing speed is typically inhibited when the consumer records are associated with the parent rules of the logic tree. On the other hand, associating the consumer records directly with the child rules of the logic tree often times promotes faster processing. Because of this limitation, most simple rules-based systems cannot realistically apply complex retailer reward program offerings—particularly if the system determines the inputs to the system, i.e., the consumer records, and performs the entire analysis at the point-of-sale (where time is limited).

While such exemplary simple offer eligibility systems and methods work for the described purposes, a need exists for improved offer eligibility systems and methods, and, in particular, for systems and methods for determining offer eligibility using a predicate logic tree against sets of input data.

SUMMARY

While the foregoing provides a general overview of some of the various features and functionalities of the subject invention, a better understanding of the objects, advantages, features, properties and relationships of the subject invention will be obtained from the following detailed description and accompanying drawings which set forth illustrative examples and which are indicative of the various ways in which the principles of the subject invention may be employed.

The present disclosure described herein relates to systems and methods for determining offer eligibility using a predicate logic tree against sets of input data. In one example, a rewards engine identifies the relevant rules corresponding to a particular deal offered by a retail establishment. For example, the rewards engine specifies which set of consumer records it believes to be relevant to the deal for the rewards engine to analyze under the relevant rules. Each rule is comprised of one or more requirements. The rewards engine evaluates the requirements of the relevant rules and resolves any variables needed to determine whether the consumer has met the deal requirements. For some deals, the rules will require some or all of the relevant consumer records to be sorted or partially sorted before variable resolution.

To the extent that certain requirements are variables which require further manipulation for resolution, the rewards engine then reevaluates the remaining requirements and attempts to resolve the remaining variables. This process is repeated until all relevant variables are resolved. Finally, the rewards engine counts the number of times that each rule corresponding to the deal has been met and resolves the nested AND/OR relationships between the rules to ultimately determine if, and/or how many times, a consumer is entitled to the deal.

BRIEF DESCRIPTION OF THE DRAWINGS

FIG. 4 is a non-specific results array and legend describing the output of the non-specific predicate logic tree diagram of FIG. 3.

DETAILED DESCRIPTION

The following description is not intended to limit the scope of the description to the precise form or forms detailed herein. Instead, the following description is intended to be illustrative so that others may follow its teachings.

Figure 1:
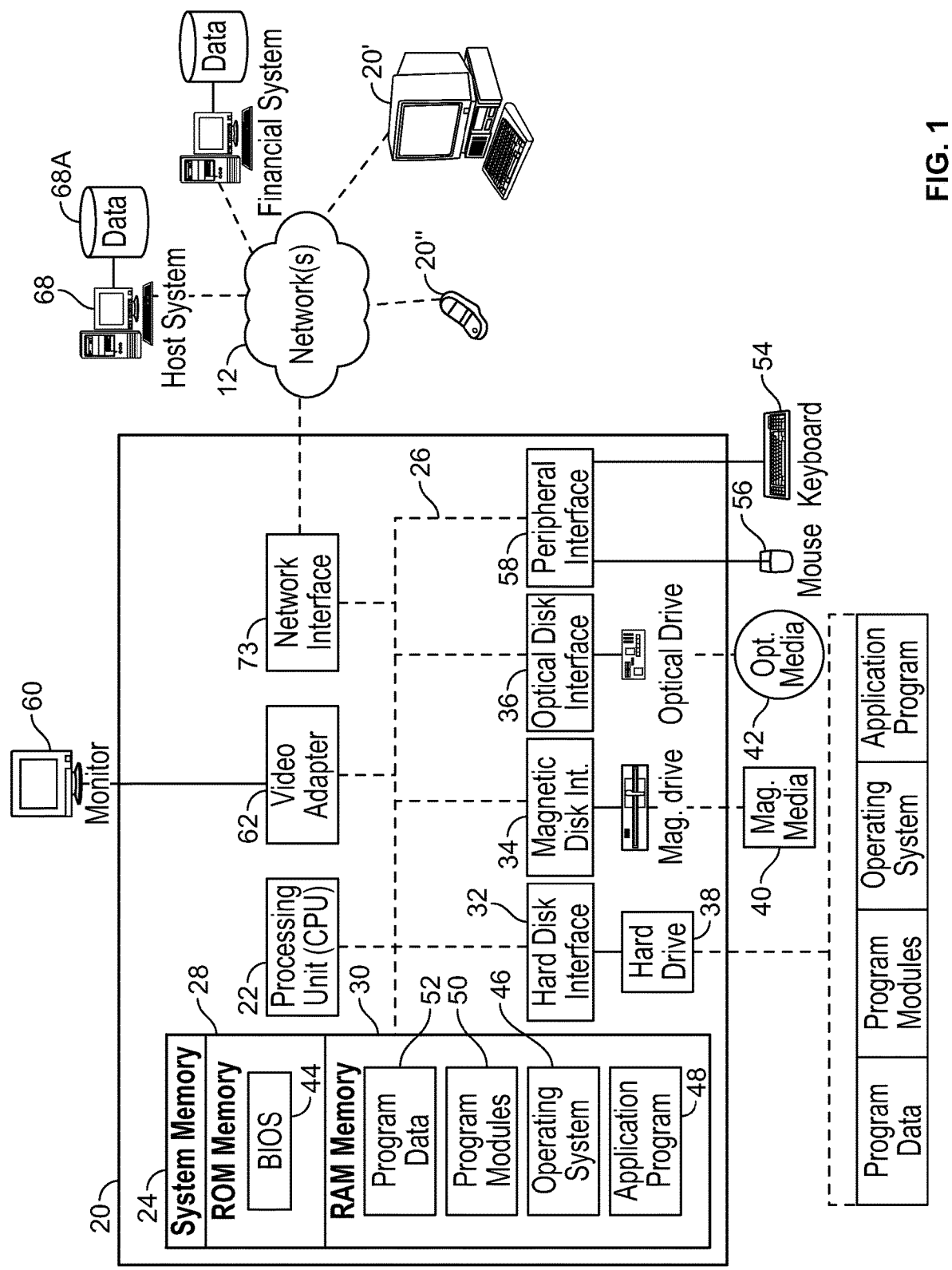
FIG. 1 illustrates, in block diagram form, components of an example computer network environment suitable for implementing the example systems and methods for determining offer eligibility using a predicate logic tree against sets of input data.

FIG. 1 illustrates a processing device 20, illustrated in the exemplary form of a mobile communication device, a processing device 20', illustrated in the exemplary form of a computer system, and a processing device 20" illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, determining offer eligibility using a predicate logic tree against sets of input data.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

In the present disclosure, the executable instructions for determining offer eligibility are collectively known as a rewards engine. The rewards engine determines whether a particular consumer is eligible for a particular deal by applying one or more rules corresponding to the particular deal to a set of consumer records (or data inputs) unique to that consumer. In some examples, the rewards engine determines the consumer's deal eligibility at the point-of-sale. In other examples, the rewards engine determines the consumer's deal eligibility at other points in time. Each consumer record has an associated array in which the relevant data comprising the consumer record are members of the array. It will be understood by those of ordinary skill in the art that the members of the consumer records arrays may, but need not, include data relating to consumer purchase history (product information, point-of-sale date/time/location information, price information, etc.), consumer profile information, and/or consumer coupon redemption information.

In the examples disclosed herein, the rewards engine selects which consumer records or set of consumer records to which a particular deal's rules should be applied. The set of consumer records to which the rewards engine applies a particular deal's rules is known as a consideration set. The rewards engine determines the consideration set when the consumer makes a purchase. For example, suppose that the consumer purchases soda and pants from a retail establishment, and the retail establishment has a deal that the consumer receives 2,000 rewards points if the consumer is currently purchasing soda and has purchased soda at least once in the past month or is currently purchasing pants and has purchased pants at least once in the past year. The rewards engine will select the consumer's current purchase record and the consumer's records from the past month relating to soda as the consideration set for the retail establishment's soda deal. Similarly, the rewards engine will select the consumer's current purchase record and the consumer's records from the past year relating to pants as the consideration set for the retail establishment's pants deal. In other words, the rewards engine does not need to analyze every single consumer record against each and every rule corresponding to a particular deal every time that a consumer makes a purchase, although the rewards engine could do so if desired. By selecting which consumer records will be analyzed for a particular deal, the rewards engine can determine deal eligibility for more complex rules more quickly than if the rewards engine analyzed all consumer records for all deals.

The rewards engine may be implemented in a variety of environments. For example, the rewards engine may be implemented by a retail establishment having only brick-and-mortar retail locations. Alternatively, the rewards engine may be implemented by a retail establishment that operates in a multi-channel retail environment, e.g., brick-and-mortar retail locations and an Internet website. Moreover, the rewards engine might be incorporated into a gameified environment, i.e., an environment that includes one or more game-like aspects for the consumer's enjoyment.

Each rule of the example rewards engine is comprised of one or more requirements. All requirements of a rule must be met to satisfy the rule. A requirement is a comparison between a key and a value. The requirement can be a simple condition or an aggregation. A simple condition is a requirement that can be fully evaluated based on consumer records pertaining to a particular consumer purchase (e.g., the consumer's current purchase) without reference to consumer records pertaining to the consumer's other (e.g., previous) purchases. An aggregation may be a group aggregation or a global aggregation. A group aggregation is a requirement that includes a function (e.g., SUM, AVERAGE, COUNT, etc.), and that can be evaluated based on consumer records pertaining to a particular consumer purchase (e.g., the consumer's current purchase) without reference to consumer records pertaining to the consumer's other (e.g., previous) purchases. A global aggregation is a requirement that includes a function (e.g., SUM, AVERAGE, COUNT, etc.) and that requires examination of the entire consideration set of consumer records for evaluation. The key and/or the value of a requirement may be a variable. There are many possible comparisons to make between a key and a value. It is contemplated that the comparison be a primitive comparison (e.g., >, <, =, ≥, ≤, ≠, etc.) or a more complex comparison (e.g., CONTAINS, IN, NOT IN, etc.) A rule can be a parent (root) rule or a child (leaf) rule. A deal can have more than one associated parent rule, and each parent rule may have a theoretically unlimited number of child rules relating to the parent rule, or none. Child rules, if any, always have one parent (or root) rule. A set of child rules corresponding to an individual parent rule may be related to one another via the AND or the OR logic operators, but the set of child rules may not have both AND and OR operators connecting the set of child rules.

There is no theoretical limit to the number of child rules that a parent rule may have or the number of levels of child rules stemming from a parent rule. Accordingly, the present disclosure describes a rewards engine that has the ability to apply complex AND/OR logic across a set of rules to determine offer eligibility. In turn, the present disclosure permits a retail establishment (or retailer) to craft as detailed and complex offers as it desires without being limited by computing or processing constraints because, according to some examples of the present disclosure, the consumer records are associated directly with the child (leaf) rules corresponding to a particular deal.

Figure 2:
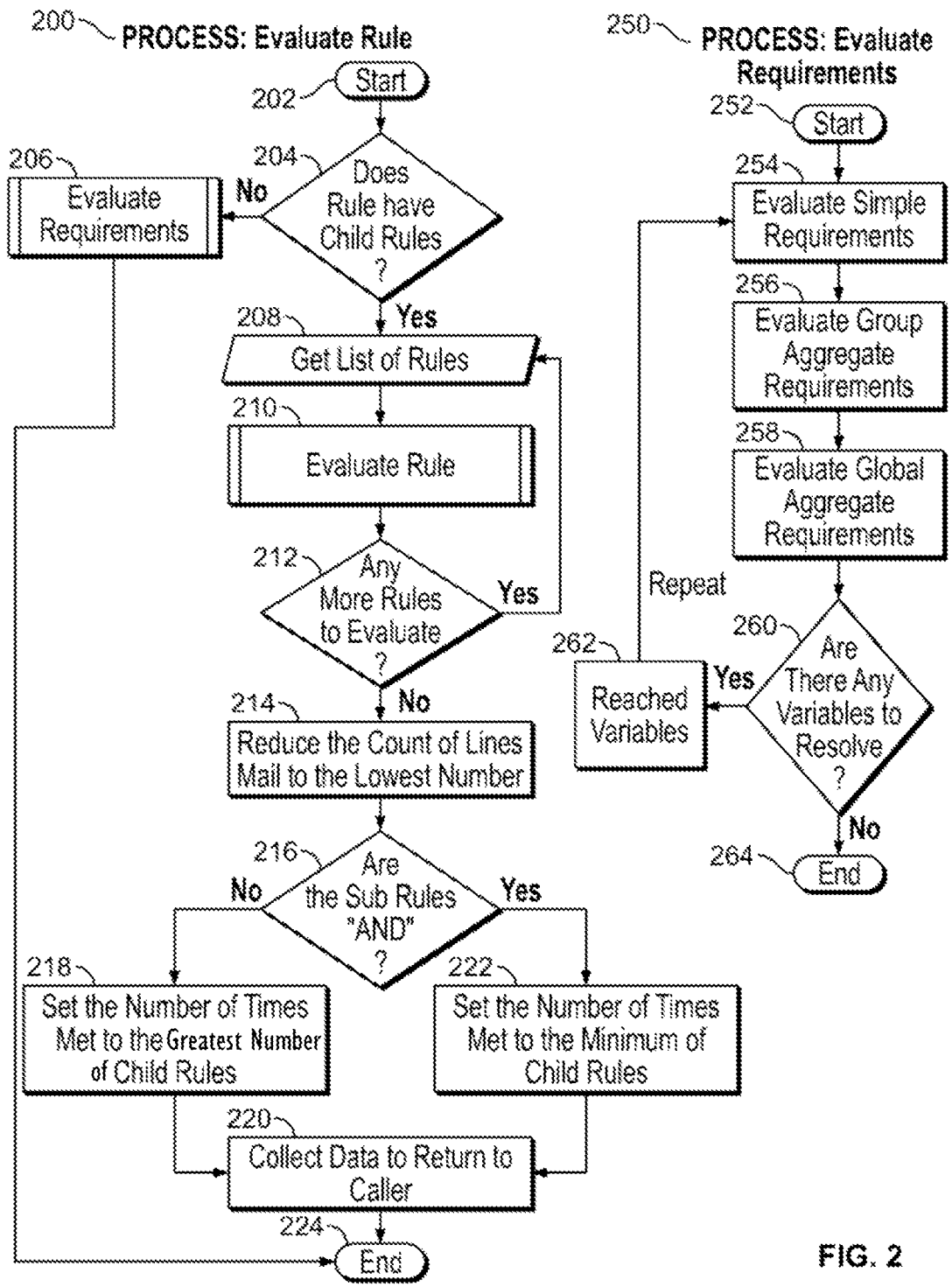
FIG. 2 is a process-flow diagram of diagram describing the various steps to examine a parent rule of the example system and method for determining offer eligibility using a predicate logic tree against sets of input data.

FIG. 2 illustrates the various steps to examine a parent rule of an example system and method for determining offer eligibility using a predicate logic tree against sets of input data. Evaluating a parent rule requires two discrete steps: (1) evaluating the rule itself and (2) evaluating the requirements comprising the rule.

In the present example, a rule evaluation process 200 sets forth the steps to evaluate a rule. The rule evaluation process 200 starts at block 202. After the rule evaluation process 200 starts at block 202, the rewards engine, which, in this example, may reside on the host system server 68 and/or other suitable computing device, determines whether the rule has any child rules at block 204. If the rule does not have any child rules, then the rule's requirements are evaluated at block 206. (A rule requirements evaluation process 250 is discussed below.) If, at block 204, the rewards engine determines that the rule has one or more child rules, then the rewards engine obtains a list of the child rules at block 208. The first child rule identified and listed at block 208 is then evaluated at block 210, which causes the rewards engine to start the rule evaluation process 200 over again at block 202 for the child rule. This process continues until the rewards engine determines that all rules and rule requirements for a particular deal have been evaluated at block 212. Once it is determined at block 212 that there are no more rules to evaluate, the rewards engine then determines how many times the consumer is entitled to a particular deal.

First, at block 214, the rewards engine counts the number of times that each individual rule has been met. In the example process flow diagram of FIG. 2, the rewards engine sets the count for each rule equal to the number of times that the requirement satisfied the least number of times within each rule has been satisfied.

Second, at block 216, the example rewards engine resolves the nested AND/OR relationships between the rules corresponding to a particular deal to determine the number of times that a consumer is entitled to that particular deal.

Specifically, the example rewards engine determines the relationship between the child rules. The relationship between the child rules ultimately determines the number of times that a consumer is entitled to receive a particular deal. If any one of the child rules must be satisfied to meet the parent rule, i.e., the child rules have an OR relationship, then the count is set to the number of times that the child rule satisfied the greatest number of times has been satisfied at block 218. If all child rules both must be satisfied to meet the parent (or immediately preceding child rule if the particular deal is defined by a multi-level predicate logic tree), i.e., the child rules have an AND relationship, then the count is reduced to the number of times that the child rule satisfied the fewest number of times has been satisfied at block 222. The count is determined and the host system server 68, or other suitable computing device, eventually transmits the results to a consumer on the mobile device 20, computer 20', etc. at block 220, and the rule evaluation process 200 terminates at block 224. The foregoing provides one example rule evaluation process. Other rule evaluation processes that incorporate a different series of steps are nevertheless within the scope of the present disclosure.

As noted above, the rule requirements evaluation process 250 is part of the rule evaluation process 200 at block 206. The rule requirements evaluation process 250 starts at block 252. Once the rule requirements evaluation process 250 commences at block 252, the simple conditions, if any, of the rule are evaluated at block 254. Next, at block 256, the group aggregations of the rule, if any, are evaluated. Next, at block 258, the global aggregations of the rule, if any, are evaluated.

At block 260, the example rewards engine then assesses whether there are any key or value variables to resolve. If at least one key or value is a variable when the rewards engine reaches block 260, then the variable or variables are resolved at block 262. Next, the rewards engine repeats blocks 254, 256, and 258 to evaluate the previously variable-laden key/value comparisons. This process repeats until there are no more variables to resolve at block 260, at which point the rule requirements evaluation process 250 terminates at block 264.

Figure 3:
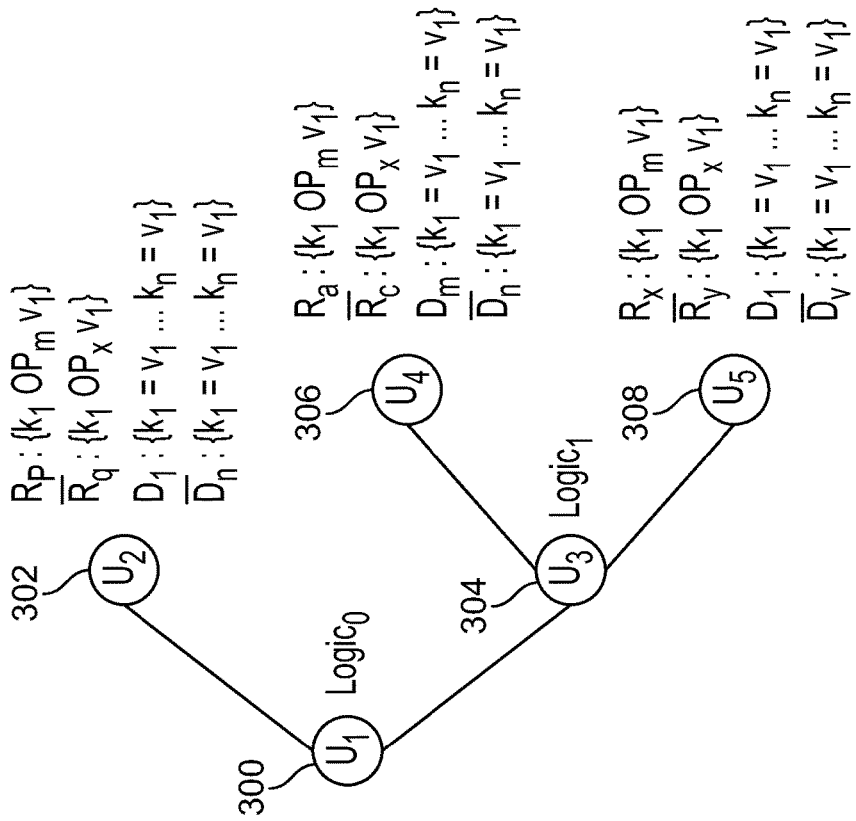
FIG. 3 is a non-specific predicate logic tree.

FIG. 3 is an example non-specific predicate logic tree depicting the various parameters, e.g., the rules, requirements, consumer records (or data inputs), key/value pairs, logical operators, etc. that define a particular deal offered by a retailer. Node 300 denotes a parent (or root rule) $U_1$. Rule $U_1$ is a parent rule because there is no other rule from which rule $U_1$ stems. Rule $U_1$ has two child rules, rule $U_2$, at node 302, and rule $U_3$, at node 304. Logic$_0$ defines the relationship between rules $U_2$ and $U_3$. Logic$_0$ may be AND or OR. Much like rule $U_1$, rule $U_3$ has two child rules, rule $U_4$ at node 306 and rule $U_5$ at node 308. Logic$_1$ defines the relationship between rules $U_4$ and $U_5$. Logic$_1$ may be AND or OR. Rule $U_6$, at node 350, like rule $U_1$, is a parent rule. Rule $U_6$ is independent from rule $U_1$. Rule $U_6$ has two child rules, rule $U_7$, at node 352, and rule $U_8$, at node 354. Logic$_1$ defines the relationship between rules $U_7$ and $U_8$.

Each rule $U_n$, has its own set of requirements, denoted $R_a \ldots R_z$. Each such requirement is a comparison between a key ($k_n$) and a value ($v_n$). It is within the spirit and scope of the present disclosure that the key may signify a wide variety of record parameters, including, by way of example only, a timestamp, a price, a particular category of product, a particular model number of a product, etc. It is further contemplated that the key may denote an aggregation, e.g., a summation, an average, a count, etc. Moreover, as noted elsewhere, the keys and values associated with a particular requirement may be variables. An operator ($OP_n$) defines the comparison between each key/value pair. There are numerous contemplated operators including, but not limited to, $=, <, >, \neq, \leq,$ and $\geq$.

A set of consumer records (or simply "consumer records" or "data inputs"), i.e., $D_a \ldots D_z$, define the $k_b$ and $v_n$ inputs relevant to a particular requirement of a particular rule. The set of consumer records may be stored in the associated data repository 68A of the host system server 68. A set of consumer records may be relevant to a particular requirement of a single rule, multiple requirements of a single rule or multiple requirements across several rules. Alternatively, the set of consumer records may not be relevant to any rule. While the rewards engine selects which consumer records it believes to be relevant to a deal, inclusion of an ultimately irrelevant consumer record will not affect the accuracy of the rewards engine in determining whether a particular consumer is entitled to the deal. The rewards engine will simply discard the irrelevant consumer record during the rule requirements evaluation process 250. It is in the retailer's best interest to apply the rewards engine only to those consumer records that are most likely to trigger a deal, as the inclusion of multiple, irrelevant consumer records may diminish the ability of the rewards engine to quickly analyze the consumer records and determine whether the consumer is entitled to a particular deal.

FIG. 4 illustrates a non-specific results array and legend describing the output of the rewards engine with respect to the non-specific logic tree diagram of FIG. 3. Following the completion of the rule evaluation process 200 and the rule requirements evaluation process 250, the rewards engine returns a results array, $\{U_a, D_q, C_{aq}\}$, where $C_{aq}$ is the number of times that rule "a" has been met by record "q." In this way, the rewards engine quantifies the relationship between a particular rewards program deal and a particular consumer for storage in the host system server 68 and for use within the computer network environment, as illustrated in FIG. 1.

Figure 5:
FIG. 5 is an example buy-to-qualify offer predicate logic tree.
Figure 5:
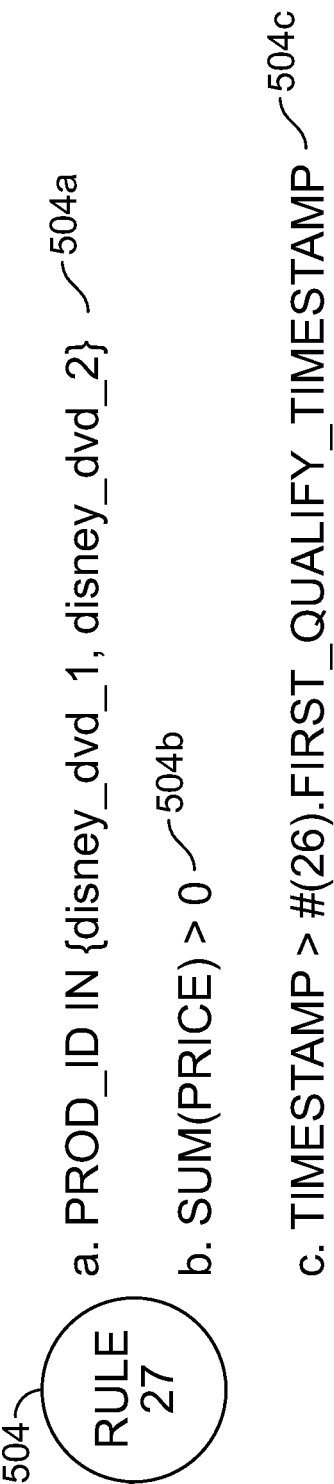

FIG. 5 illustrates an example buy-to-qualify offer predicate logic tree. This example predicate logic tree represents an example rewards program deal that a retailer may offer to consumers. The example rewards program deal represented by FIG. 5 is: "Buy a Blu-Ray player from Sony today for $199 or more, and on your next purchase of a Blu-Ray DVD from Disney, get 20,000 rewards points." This example rewards program deal is represented by three rules: rule 0 at node 500, rule 26 at node 502, and rule 27 at node 504. Rule 0 is a parent (or root) rule and rules 26 and 27 are child (or leaf) rules. The logic relationship between child rules 26 and 27 is AND, which means that both rules 26 and 27 must be satisfied to meet parent rule 0 and, in turn, for the consumer to be entitled to this Disney Blu-Ray DVD deal.

Beginning with rule 26 at node 502, rule 26 has a first requirement 502a, which requires that the consumer purchase a Sony Blu-Ray player. The first requirement 502a is represented in FIG. 5 as PROD_ID IN(sony_player_1, sony_player_2). In this example FIG. 5, sony_player_1 and sony_player_2 are two possible Sony Blu-Ray players available for purchase by a consumer. The first requirement 502a is a simple condition. In contrast, a second requirement 502b is a group aggregation, which requires that the total price of the consumer's current Sony Blu-Ray player purchase or purchases be at least $199. This requirement is represented by SUM(PRICE, GROUP_TRANS)≥199.00. Finally, a third requirement 502c, a global aggregation, requires that the consumer purchase the Sony Blu-Ray player before the Disney Blu-Ray DVD. In this example, the third requirement 502c is represented by GROUP_ID NOT IN #(27).GROUP_ID. It is contemplated that different words, symbols, and/or syntax may be used for any key, value, operator, comparison, consumer record, or other rewards engine parameter without departing from the spirit or scope of the invention.

Rule 27 at node 504 has three requirements. A first requirement 504a requires that the consumer purchase a Disney Blu-Ray DVD. The first requirement 504a is represented in FIG. 5 as PROD_ID IN(disney_dvd_1, disney_dvd_2). In this example FIG. 5, disney_dvd_1 and disney_dvd_2 are two possible Disney Blu-Ray DVDs available for purchase by a consumer. A second requirement 504b requires that the total price of the Disney Blu-Ray DVDs purchased by the consumer exceed $0. This requirement is represented by SUM(PRICE)>0. Finally, a third requirement 504c requires that the consumer purchase the Disney Blu-Ray DVD after purchasing a qualifying Sony Blu-Ray player. In this example, the third requirement 504c is represented by TIMESTAMP>#(26).FIRST_QUALIFY_TIMESTAMP, where TIMESTAMP is the date and time of the consumer's Disney Blu-Ray DVD purchase and #(26).FIRST_QUALIFY_TIMESTAMP is the date and time of the consumer's first qualifying Sony Blu-Ray player purchase. In this example predicate logic tree, the third requirement 504c requires that the consumer records that meet rule 26 at node 502 be sorted by the TIMESTAMP key to determine whether the third requirement 504c is satisfied. The requirements of a rule will sometimes require sorting or partial sorting of consumers records, as is the case in the example of FIG. 5. However, in other examples, no sorting or partial sorting of consumer records will be required. Returning to FIG. 5, if at least one consumer record satisfies rule 26 at node 502 and at least one consumer record satisfies rule 27 at node 504, then parent rule 0 at node 500 is satisfied, and the consumer has met the deal's requirements and will receive 20,000 points as part of the retailer's rewards program.

Figure 6:
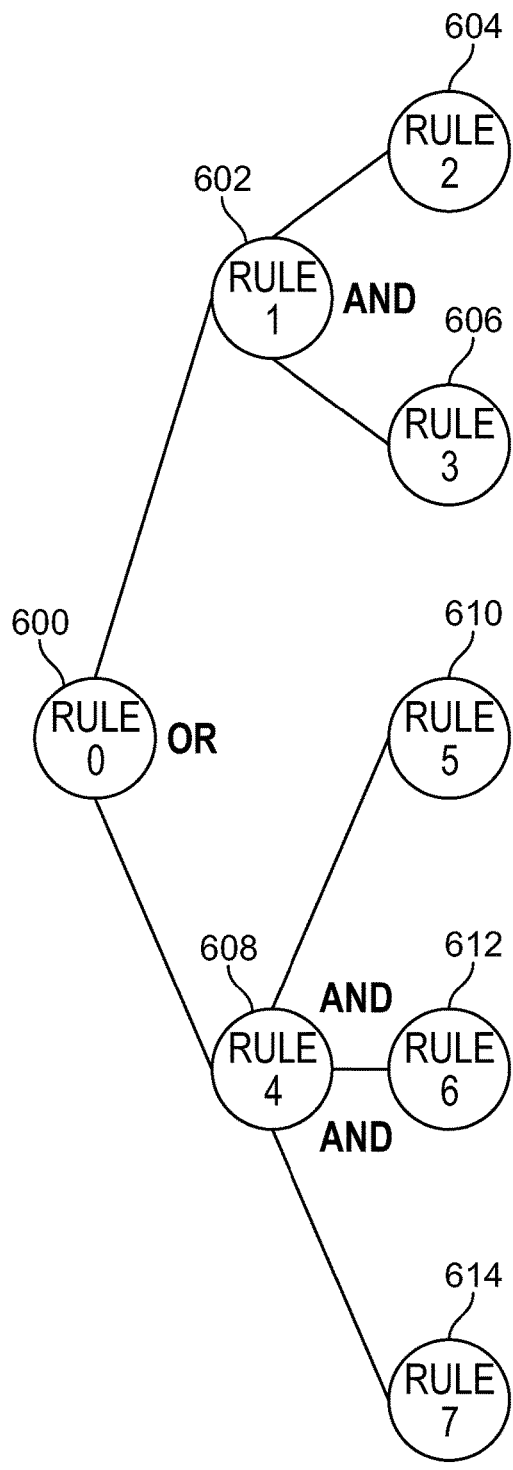
FIG. 6 is an example multi-phase complex offer with boolean qualification predicate logic tree.

FIG. 6 illustrates an example multi-phase complex offer with boolean qualification predicate logic tree. This example predicate logic tree represents an example rewards program deal that a retailer may offer to consumers. The example rewards program deal represented by FIG. 6 is: "Buy 1 pack of baseball cards AND 2 packs of gum, OR purchase any non-gum candy item AND 1 comic book, wherein the comic book costs $7.99 or more, AND redeem coupon 12356 and get 10,000 points." This example rewards program deal is represented by eight rules: Rule 0 at node 600, rule 1 at node 602, rule 2 at node 604, rule 3 at node 606, rule 4 at node 608, rule 5 at node 610, rule 6 at node 612 and rule 7 at node 614.

Rule 0 at node 600 is a parent (or root) rule and rules 1 and 4 at nodes 602 and 608 respectively are child rules. The logic relationship between child rules 1 and 4 at nodes 602 and 608 respectively is OR, which means that either rule 1 at node 602 or rule 4 at node 608 must be satisfied to meet parent rule 0 at node 600 and, in turn, for the consumer to be entitled to the deal. In this example, rule 1 at node 602 also has two child rules, rules 2 and 3 at nodes 604 and 606 respectively. The logic relationship between child rules 2 and 3 at nodes 604 and 606 respectively is AND, which means that both rules 2 and 3 at nodes 604 and 606 respectively must be satisfied to meet rule 1 at node 602.

Rule 4 at node 608 has three child rules, rules 5, 6, and 7 at nodes 610, 612, and 614 respectively. The logic relationship between child rules 5, 6, and 7 at nodes 610, 612, and 614 respectively is AND, which means that rules 5, 6, and 7 at nodes 610, 612, 614 respectively must all be satisfied to meet rule 4 at node 608.

Beginning with rule 2 at node 604, rule 2 has a first requirement 604a, which requires that the consumer purchase a pack of baseball cards. The first requirement 604a is represented in FIG. 6 as PROD_ID IN(baseball card). A second requirement 604b requires that the consumer purchase at least one pack of baseball cards. This requirement is represented by SUM(UNITS)≥1.

Rule 3 at node 606 has two requirements. A first requirement 606a requires that the consumer purchase gum. The first requirement 606a is represented in FIG. 6 as PROD_ID IN (gum). A second requirement 606b requires that the consumer purchase at least two packs of gum. This requirement is represented by SUM(UNITS)≥2. If at least one record satisfies rule 2 at node 604 and at least one record satisfies rule 3 at node 606, then rule 1 at node 602 is satisfied.

In this example, rule 5 at node 610 has a first requirement 610a which requires that the consumer purchase non-gum candy. The first requirement 610a is represented in FIG. 6 as PROD_ID IN(candy). A second requirement 610b requires that the consumer purchase at least one item of non-gum candy. The second requirement 610b is represented by SUM(UNITS)>0.

Rule 6 at node 612 has a first requirement 612a which requires that the consumer purchase a comic book. The first requirement 612a is represented in FIG. 6 as PROD_ID IN(comics). A second requirement 612b requires that the comic book cost at least $7.99. The second requirement 612b is represented by PRICE≥7.99. A third requirement 612c requires that the consumer purchase at least one comic book. The third requirement 612c is represented by SUM (UNITS)≥1.

Rule 7 at node 614 has a first requirement 614a which requires that the consumer redeem coupon 12356. The first requirement 614a is represented by COUPON_CODE IN(12356). A second requirement 614b requires that the consumer redeem coupon 12356 at least one time. The second requirement 614b is represented by SUM(UNITS) ≥1. If at least one record satisfies these two requirements of rule 7 at node 614, if at least one record satisfies rule 5 at node 610, and at least one record satisfies rule 6 at node 612, then rule 4 at node 608 is satisfied.

As noted in FIG. 6, rule 7 at node 614 has a boolean counting type 614c associated with it. The boolean counting type 614c prevents the consumer from qualifying and receiving 10,000 rewards points more than once based on multiple redemptions of coupon 12356. In practice, the rewards engine interprets the boolean counting type 614c as meaning that rule 7 at node 614 can be met only once or not met at all. In other words, rule 7 at node 614 cannot be met more than once. The boolean counting type 614c differs from the default, natural counting types of the other rules of this example multi-phase complex offer predicate logic tree. These rules, namely, rules 2, 3, 5, and 6, can be met more than once. In practice, this means that if the consumer meets rules 2 and 3 five separate times, then the consumer may receive 50,000 rewards program points.

As noted above, as long as rule 1 at node 602 or rule 4 at node 608 is satisfied, then rule 0 at node 600 is satisfied and the rewards engine will award the consumer 10,000 rewards program points.

Although certain examples have been described herein, the scope of coverage of this patent is not limited thereto. On the contrary, this patent covers all processes, methods, and systems fairly falling within the scope of the appended claims either literally or under the doctrine of equivalents.

I claim:

1. A method, comprising:
identifying a plurality of rules of a deal offered by a retail establishment, wherein:
the plurality of rules comprises a parent rule and a plurality of child rules, and
the plurality of rules have a nested AND/OR relationship in a predicate logic tree;
evaluating the parent rule, as a first instance of a rule evaluation process;
evaluating each of the child rules, nested within the first instance of the rule evaluation process, as a second instance of the rule evaluation process, wherein:
each child rule comprises either two additional child rules or one or more requirements of a plurality of requirements;
if a child rule comprises two additional child rules, each additional child rule is evaluated as a next instance of the rule evaluation process; and
if a child rule comprises one or more requirements, the child rule is evaluated by:
selecting a plurality of consumer records associated with a consumer;
associating the respective plurality of consumer records with the corresponding child rule according to the predicate logic tree, wherein:
the one or more requirements of each child rule are applied to a respective set of consumer records, and
the respective sets of consumer records for each child rule are different sets selected from the consumer records;
evaluating the one or more requirements of each corresponding child rule against the respective set of consumer records; and
resolving the nested AND/OR relationship of the plurality of rules.

2. The method according to claim 1, wherein the plurality of requirements comprises one or more simple conditions and one or more aggregations.

3. The method according to claim 2, wherein the one or more simple conditions comprise a requirement that is evaluated based on a current purchase of the consumer without reference to the consumer records of the consumer related to previous purchases.

4. The method according to claim 2, wherein the one or more aggregations comprise a group aggregation that comprises a function that is evaluated based on the current purchase of the consumer without reference to the consumer records of the consumer related to previous purchases.

5. The method according to claim 2, wherein the one or more aggregations comprise a global aggregation that comprises a function that is evaluated based on the consumer records of the consumer that is relevant to the deal offered by the retail establishment.

6. The method according to claim 1, wherein the set of requirements comprises one or more simple conditions and one or more aggregations, wherein the one or more aggregations comprise one or more functions.

7. The method according to claim 1, comprising sorting or partially sorting at least two consumer records of the plurality of consumer records.

8. The method according to claim 1, comprising tracking eligibility of the consumer for the deal.

9. The method according to claim 1, wherein the method is performed in a multi-channel retail environment.

10. The method according to claim 1, wherein the method is performed in a gameified environment.

11. The method according to claim 1, wherein the predicate logic tree is operable to provide an output that is associated with an array that comprises members that comprise one or more of a particular rule, a particular consumer record, and a number of times that the particular rule has been met by the particular consumer record.

12. The method according to claim 1, comprising:
resolving one or more variables of the set of requirements; and
repeating the steps of evaluating and resolving until all variables are resolved.

13. The method according to claim 1, wherein the plurality of rules relates to whether a first item is being purchased by the consumer.

14. The method according to claim 13, wherein the plurality of rules relates to whether a second item is being purchased by the consumer.

15. The method according to claim 14, wherein the plurality of rules relates to whether the second item was previously purchased by the consumer within a particular time period.

16. The method according to claim 13, wherein the plurality of rules relates to whether the first item was previously purchased by consumer within a particular time period.

17. The method according to claim 1, wherein the selected plurality of consumer records for the consumer making the purchase is selected as a subset of all the consumer records for the consumer.

18. The method according to claim 1, wherein a relationship between two or more child rules determines a number of times that the consumer is entitled to receive the deal.

19. The method according to claim 1, comprising performing a third instance of the rule evaluation process for each of a plurality of grandchild rules nested within the second instance of the rule evaluation process.

20. The method according to claim 1, wherein the plurality of rules comprises a rule that provides for sorting of a portion of the plurality of consumer records.

* * * * *